O. T. HOLBROOK.
Reaping and Mowing Machine.
No. 45,827.
Patented Jan. 10, 1865.
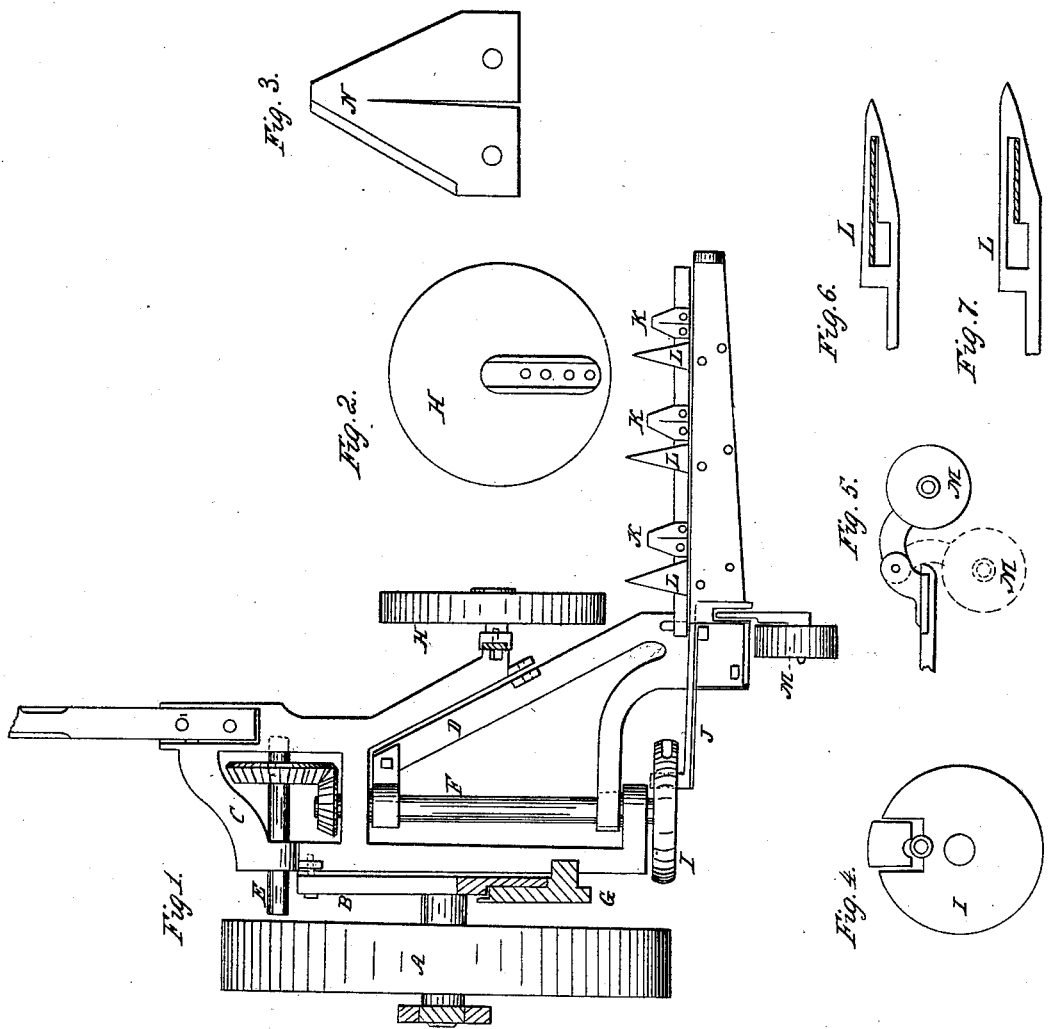

UNITED STATES PATENT OFFICE.

OLIVER T. HOLBROOK, OF RUSHVILLE, NEW YORK.

IMPROVEMENT IN REAPING AND MOWING MACHINES.

Specification forming part of Letters Patent No. 45,827, dated January 10, 1865.

*To all whom it may concern:*

Be it known that I, OLIVER T. HOLBROOK, of Rushville, in the county of Yates and State of New York, have invented a new and useful Improvement in Mowers and Reapers; and I do hereby declare that the following is a full, clear, and exact description of the construction and operation of the same, reference being had to the annexed drawings, making a part of this specification, in which—

Figure 1 is a plan or top view of the whole machine. Fig. 2 is an inside view of the supporting-wheel and axle. Fig. 3 is an upper side view of one of the cutters. Fig. 4 is a view of the crank-wheel, with a part removed to show how the connection is held within it. Fig. 5 is a side view of the rear supporting-wheel and its axle. Figs. 6 and 7 are side views of the guard-fingers.

The letters of reference refer to the same parts in each figure.

A is the driving-wheel, of any ordinary construction. It may be provided with any kind of gear-wheels, secured to its inner face, that may be desired to drive the other parts of the machine. It turns upon and is held by the axle of the plate B.

B is an iron plate. It is bounded by straight lines at the upper and lower edges, and the segment of a circle at the rear end. To it the the axle is securely fastened. At the rear or circular end is a series of holes made to insert bolts or pins to hold the frame C' in any required position. Through the forward end is a hole for a bolt that passes through it into the frame C', and this bolt forms a pivot for the frame C' to turn upon, and it holds the plate and frame together.

C is the frame that supports the gearing and various parts of the machine. It is made of iron, and in shape as represented in Fig. 1. At the forward end the pole is attached. Across the forward part the axle E is placed, so as to hold a bevel-wheel that drives the bevel-wheel on the axle F. It is also made to hold the axle F, that carries the crank-wheel I, and at the rear edge of the cross-piece is a sleeve that surrounds the axle F, and at the forward edge of the rear end is another sleeve that surrounds the same axle. These sleeves are centrally on the same line with the axle F, and they constitute the support for the frame D, and upon them it turns. The frame is provided with a circular guide, G, that holds the rear end of the plate B to it. At the right side, and nearly in line with the main axle, is a projection fitted to receive the sliding axle of the wheel H, and at this end of the frame is another projection with a hole through it, that is made to receive a bolt when the machine is used for reaping. This frame is held to the plate B by a bolt, upon which it turns, and the guide G. It may be adjusted by raising or lowering the hind end, and be held by bolts or pins put in the holes in the circular end of the plate B.

D is a frame that is hinged to the frame C'. It is made in shape as shown in Fig. 1, and may be curved up or down, as desired. It is hinged to the frame C' by having a hole in the left arm of the frame to receive the sleeve of the rear end of the frame C'. The forward end is fastened to the forward sleeve by a journal-box, as represented in Fig. 1. The use of the turning joints is to allow the rear end of this frame to be turned up or down, thereby raising or lowering the finger-bar, and keep the cutters in their relative position with respect to the guard-fingers when the finger-bar is vertical or horizontal. To the rear end of this frame the finger-bar is securely fastened. At the right side is a projection corresponding with the projection on the frame C'. It has a hole through it. Through these projections a bolt is put when the machine is used for reaping.

E is an axle that is placed across the forward part of the frame C', and is used to hold the driving-wheels.

F is an axle that passes through the sleeves of the frame C'. It supports a pinion at the forward end and the crank-wheel I at the rear end.

G is a circular guide or clasp. It is fastened to the frame C, and is shaped to receive the rear end of the plate B, and holds it snugly to the frame C.

H is a supporting-wheel, made plain and of any convenient size required. It has an axle through it. The axle is made with a piece made at right angles with it. This piece is grooved to suit the projection on the frame C, also the vertical projection at the right end of the finger-bar. It is shown in Fig. 2. When the machine is used for mowing, this wheel is fastened to the projection of the frame C', and when the machine is used for reaping it is fastened to the right end of the finger-bar. By means of holes (shown in Fig. 2) it may be adjusted to carry the frame or finger-bar as high or low as may be required.

I is a crank-wheel. It may be made heavy to have the properties of a balance-wheel. It is securely fastened to the axle F. It has a hole through it to receive the end of the connection J. It has a mortise made into it from the periphery, as shown in Fig. 4, where a part is removed to show the mortise and the tenon-shaped piece within it. This piece is made with the inner end to fit into a groove that is made around the connection for the purpose of holding the connection in its place. This piece is held in place by means of a screw that passes through the side of the wheel.

J is a connection that connects the crank-wheel to the cutter-bar. The end that enters the wheel is made round and at right angles with the other part, and has a groove around it to receive the end of the piece that holds it within the wheels. The other end is made to connect the cutter-bar in any convenient manner.

K is one of the cutters, and is represented in Fig. 3. It has a slit extending from the rear to near the forward end. By means of this slit either part may be raised higher than the other for the purpose of preventing clogging in the guard-fingers. The cutter-bar may be made to receive the cutter with one part raised; or the raised part may have a piece of sheet metal the proper thickness laid under it before the cutter is fastened to the bar. The side of the cutter that is raised is beveled at the under side and the side that is lowered is beveled at the upper side.

L and L are guard-fingers, made as shown in Figs. 6 and 7. They are what is denominated "closed" guards. The peculiar construction is beveling the edges where the cutter passes through them. On one side they are beveled above the cutter and on the other side they are beveled below the cutter, for the purpose of preventing the cutter catching the guard when the cutter is made as above specified.

M is a supporting-wheel. A rear view is shown in Fig. 1 and a side view in Fig. 5. It may be attached to the rear edge of the finger-bar or rear end of the frame D. Its use is to raise the finger-bar when the machine is moved backward. It is jointed in its attachment to the machine, and is made as represented in the figures, and when the machine is moving forward it will be in position as shown in Fig. 5, and when the machine is moving backward it will be in the position shown by the dotted lines in the same figure, thus preventing the finger-bar from catching to the ground.

What I claim, and desire to secure by Letters Patent, is—

1. The combination, with the main frame C', constructed as described, of the secondary frame D and plate B, arranged and operating in the manner set forth.

2. The cutters K, formed with a slit in the rear, as shown and described, when arranged upon and secured to the bar in the manner specified, whereby one part of the rear end thereof is elevated above the other, for the purpose and in the manner set forth.

OLIVER T. HOLBROOK.

Witnesses:
   JOHN L. LEWIS,
   CHARLES KETCHUM.